(12) United States Patent
Kim et al.

(10) Patent No.: US 9,804,903 B2
(45) Date of Patent: Oct. 31, 2017

(54) DATA PROCESSING APPARATUS FOR PIPELINE EXECUTION ACCELERATION AND METHOD THEREOF

(71) Applicant: Electronics and Telecommunications Research Institute, Daejeon (KR)

(72) Inventors: Kang-Ho Kim, Daejeon (KR); Kwang-Won Koh, Daejeon (KR); Seung-Hyub Jeon, Anyang (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 249 days.

(21) Appl. No.: 14/616,894

(22) Filed: Feb. 9, 2015

(65) Prior Publication Data

US 2015/0254116 A1    Sep. 10, 2015

(30) Foreign Application Priority Data

Mar. 4, 2014  (KR) ........................ 10-2014-0025501

(51) Int. Cl.
*G06F 9/54* (2006.01)

(52) U.S. Cl.
CPC ............... *G06F 9/544* (2013.01); *G06F 9/54* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 2002/0188691 A1* | 12/2002 | Ignatius | ................ | G06F 3/0613 709/208 |
| 2009/0249356 A1* | 10/2009 | He | .......................... | G06F 9/526 719/314 |
| 2012/0130950 A1* | 5/2012 | Jain | .................... | G06F 17/30212 707/634 |
| 2013/0227201 A1* | 8/2013 | Talagala | .............. | G06F 12/0246 711/103 |
| 2014/0195571 A1* | 7/2014 | Wang | ................ | G06F 17/30132 707/823 |
| 2015/0052295 A1* | 2/2015 | Danilak | .............. | G06F 12/0246 711/103 |

FOREIGN PATENT DOCUMENTS

KR    10-2008-0057473    6/2008
KR    10-2012-0131678    12/2012

* cited by examiner

*Primary Examiner* — Andy Ho
*Assistant Examiner* — Abdou Seye
(74) *Attorney, Agent, or Firm* — Staas & Halsey LLP (57) ABSTRACT

Disclosed herein are a data processing apparatus for pipeline execution acceleration and a method thereof. According to an exemplary embodiment of the present invention, the data processing apparatus for pipeline execution acceleration includes: a processor configured to sequentially execute a first application program and a second application program reading or writing a specific file; and a file system configured to complete a write for a file data for the specific file to a data block previously allocated from the first application program and provide the file data for the specific file to the second application program prior to executing a close call for the specific file from the first application program, when executing a read call for the specific file from the second application program.

11 Claims, 9 Drawing Sheets

DATA PROCESSING APPARATUS FOR PIPELINE EXECUTION ACCELERATION AND METHOD THEREOF

CROSS REFERENCE TO RELATED APPLICATION

This application claims the benefit of Korean Patent Application No. 10-2014-0025501, filed on Mar. 4, 2013, entitled "Data Processing Apparatus for Pipeline Execution Acceleration And Method Thereof", which is hereby incorporated by reference in its entirety into this application.

BACKGROUND OF THE INVENTION

1. Technical Field

The present invention relates to a data processing apparatus, and more particularly, to a data processing apparatus and a method thereof capable of easily shortening an execution time of a pipeline for a plurality of application programs executed according to a preset order, which is executed by a pipeline processor.

2. Description of the Related Art

A pipeline is called a set of various application programs which are sequentially executed to achieve one object. A technology of sequentially executing various application programs and using a file as an input and output connection medium executes only one of several stages on a pipeline and therefore an execution time of the pipeline is a sum of the execution time of each stage.

The execution time of the pipeline configured of several stages which is executed at one node is a sum of the execution time which executes all the plurality of application programs corresponding to each stage and a total of execution time also includes an access time to a reservoir.

To increase operation efficiency of the pipeline, there is a need to shorten the execution time of the pipeline operation.

Today, to shorten the execution time of the pipeline using a generally used technology, there is a need to use a method for replacing other application programs having a shorter execution time than the present, using a high-performance file system, or the like. The method requires a lot of time and cost and therefore may not be easily used. Since an IT amateur mainly manufactures and uses the pipeline, it is very difficult to actually apply a method for shortening an execution time using a special technique for modifying and inputting and outputting source codes of application programs.

A technology of using a pipeline of an operating system as an input and output medium between stages has two problems. When the file is simply changed to a pipe, a natural flow of pipeline processing and execution starting timing of the application program are reversed and thus a pipeline user is confused. Further, the pipe has very different characteristics from the file and therefore may not use the same method as the file.

At the time of using a general operating system pipe, a problem of pipe disconnection may be solved, but other problems such as pipe management and a reverse of the execution order of the application program may occur.

SUMMARY OF THE INVENTION

The present invention has been made in an effort to a data processing apparatus and a method thereof capable of easily shortening an execution time of a pipeline for a plurality of application programs executed according to a set order which is executed by a pipeline processor.

However, objects of the present invention are not limited to the above-mentioned matters and other objects can be clearly understood to those skilled in the art from the following descriptions.

According to an exemplary embodiment of the present invention, there is provided a data processing apparatus for pipeline execution acceleration, including: a processor configured to sequentially execute a first application program and a second application program reading or writing a specific file; and a file system configured to complete a write for a file data for the specific file to a data block previously allocated from the first application program and provide the file data for the specific file to the second application program prior to executing a close call for the specific file from the first application program, when executing a read call for the specific file from the second application program.

The file system may be implemented as a virtual ring type storage space configured of a data block in which some of the file data within the specific file are stored to use a circular queue in which a queue_tail representing a position for reading the file data within the ring type storage space and a queue_head representing a position for adding the file data are set.

The file system may set a queue_index representing a start position of the circular queue at the time of executing the read call for the specific file from the second application program and read a file data having a preset size from the set queue_index and then change the queue_tail of the circular queue.

The file system may check an offset and a size included in a received read request message in response to the read call and set the queue_index using the offset when a size of the circular queue is larger than the size and the specific file is closed, wherein the offset represents a value up to a position spaced apart from a start position of the specific file previously stored within the circular queue and the size represents a size of a data to be read.

The queue_tail may be obtained by the following Equation (queue_tail=(queue_tail+size) modulo queue_size), in which the queue_tail represents the queue_tail previously set within the circular queue, the size represents the size of data to be read, and the queue_size represents a size of the circular queue.

The file system may set a queue_index representing a start position of the circular queue at the time of executing the write call for the specific file from the second application program and record a file data having a preset size from the set queue_index and then change the queue_head of the circular queue.

The file system may check an offset and a size included in a received write request message in response to the write call and set the queue_index using the offset when the offset is included in an empty section of the circular queue and an available space of the circular queue is larger than the size, wherein the offset represents a value up to a position spaced apart from a start position of the specific file previously stored within the circular queue and the size represents a size of a data to be read.

The queue_head may be obtained by the following Equation (queue_head=(queue_head+size) modulo queue_size), in which the queue_head represents the queue_head previously set within the circular queue, the size represents the size of data to be read, and the queue_size represents a size of the circular queue.

The file system may include: a file system application programming interface (API) configured to perform write and read operations of the specific file at the time of executing a read and write call for the specific file; a file state management module configured to update previously generated call information at the time of executing the read call and the write call for the specific file and provide the call information to allow the file system API to perform the read and write operations for the specific file; and a file storage management module configured to manage the file data for the specific file and read or write the file data at the time of executing the read call and the write call from the first and second application programs.

According to another exemplary embodiment of the present invention, there is provided a data processing method for pipeline execution acceleration, including: sequentially, by a processor, executing a first application program and a second application program reading or writing a specific file; and completing a write for a file data for the specific file to a data block previously allocated from the first application program and providing the file data for the specific file to the second application program prior to executing a close call for the specific file from the first application program, when a file system executes a read call for the specific file from the second application program.

In the providing, the file system may provide the file data for the specific file stored in the data block within the circular queue to the second application program, in which the circular queue is implemented as a virtual ring type storage space configured of a data block in which some of the file data within the specific file are stored to use a circular queue in which a queue_tail representing a position for reading the file data within the ring type storage space and a queue_head representing a position for adding the file data are set.

In the providing, a queue_index representing a start position of the circular queue may be set at the time of executing the read call for the specific file from the second application program and a file data having a preset size from the set queue_index may be read and then the queue_tail of the circular queue may be changed.

In the providing, an offset and a size included in a received read request message may be checked in response to the read call and the queue_index may be set using the offset when the size of the circular queue is larger than the size and the specific file is closed, in which the offset represents a value up to a position spaced apart from a start position of the specific file previously stored within the circular queue and the size represents a size of a data to be read.

The queue_tail may be obtained by the following Equation (queue_tail=(queue_tail+size) modulo queue_size), in which the queue_tail represents the queue_tail previously set within the circular queue, the size represents the size of data to be read, and the queue_size represents a size of the circular queue.

In the providing, a queue_index representing a start position of the circular queue may be set at the time of executing the write call for the specific file from the second application program and a file data having a preset size from the set queue_index may be recorded and then the queue_head of the circular queue may be changed.

In the providing, an offset and a size included in a received write request message may be checked in response to the write call and the queue_index may be set using the offset when the offset is included in an empty section of the circular queue and an available space of the circular queue is larger than the size, in which the offset represents a value up to a position spaced apart from a start position of the specific file previously stored within the circular queue and the size represents a size of a data to be read.

The queue_head may be obtained by the following Equation (queue_head=(queue_head+size) modulo queue_size), in which the queue_head represents the queue_head previously set within the circular queue, the size represents the size of data to be read, and the queue_size represents a size of the circular queue.

DESCRIPTION OF EXEMPLARY EMBODIMENTS

Only a principle of the present invention will be described below. Therefore, although the principle of the present invention is not clearly described or shown in the specification, those skilled in the art can implement a principle of the present invention and invent various apparatuses included in a concept and a scope of the present invention. In addition, conditional terms and exemplary embodiments described in the specification are in principle used only for purposes for understanding the concept of the present invention.

The foregoing objects, features and advantages will become more apparent from the following description of preferred exemplary embodiments of the present invention with reference to accompanying drawings, which are set forth hereinafter. Accordingly, those having ordinary knowledge in the related art to which the present invention pertains will easily embody technical ideas or spirit of the present invention. Further, when technical configurations known in the related art are considered to make the contents obscure in the present invention, the detailed description thereof will be omitted.

In particular, an exemplary embodiment of the present invention proposes a new method for shortening an execution time of a pipeline by supporting execution overlapping between stages while using file medium input and output connection as it is. That is, characteristics of the pipeline are 1) a use of an output of a previous stage as an input by application programs of each stage and 2) a direct generation of an output by being executed from the moment the input is provided and execution overlapping between pipeline stages using the pipeline characteristics.

Figure 1:
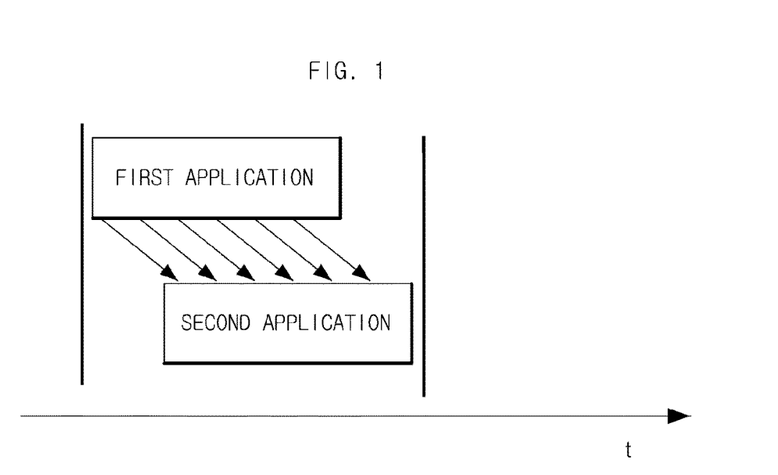
FIG. 1 is a diagram for describing an execution overlapping principle between pipeline stages according to an exemplary embodiment of the present invention.

FIG. 1 is a diagram for describing an execution overlapping principle between pipeline stages according to an exemplary embodiment of the present invention.

As illustrated in FIG. 1, a principle of receiving and executing an output data of a first application as an input by a second application while the first application is executed.

That is, the second application directly processes data generated by the first application without waiting until the first application ends. By doing so, most of the execution time of the second application may overlap the first application, which may be greatly reduced, compared with sequentially executing the overall execution time of the pipeline configured of two stages.

Figure 2:
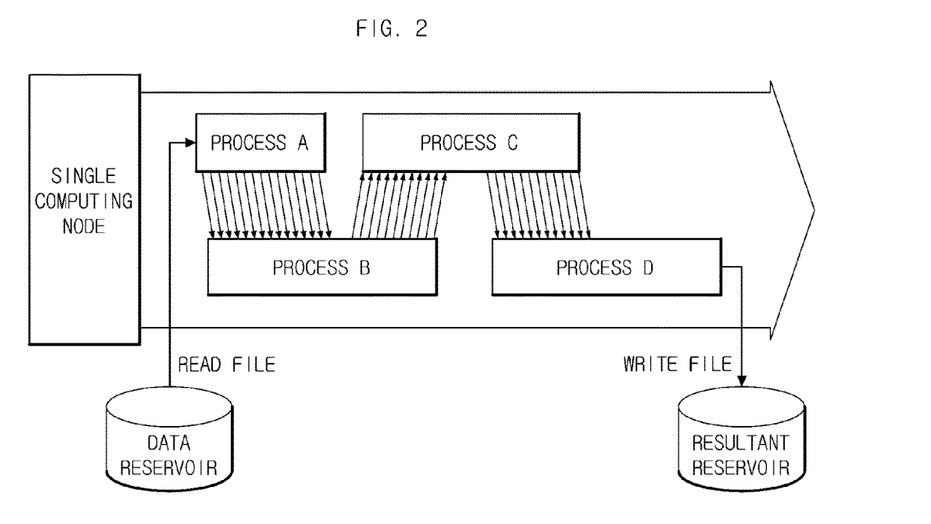
FIG. 2 is a first diagram for describing an execution principle using a remote pipe according to an exemplary embodiment of the present invention.

FIG. 2 is a diagram for describing a first execution principle using a remote pipe according to an exemplary embodiment of the present invention.

FIG. 2 illustrates a process of executing a pipeline which is configured of several stages, for example, process A, process B, process C, and process D using a remote pipe.

Figure 3:
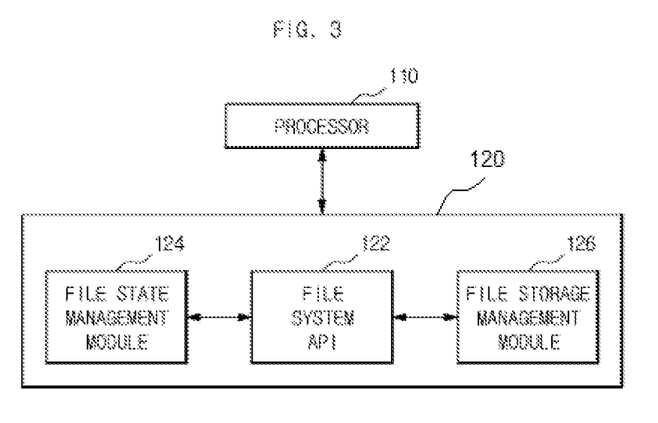
FIG. 3 is a control block diagram illustrating a control configuration of a data processing apparatus according to an exemplary embodiment of the present invention.
Figure 4:
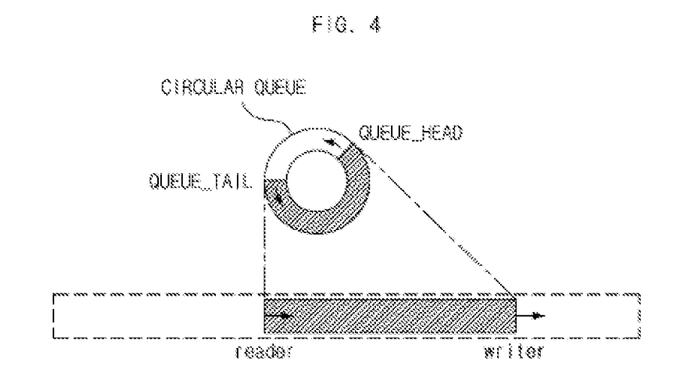
FIG. 4 is a diagram illustrating data management for a specific file in a file storage management module illustrated in FIG. 3.

FIG. 3 is a control block diagram illustrating a control configuration of a data processing apparatus according to an exemplary embodiment of the present invention and FIG. 4 is a diagram illustrating data management for a specific file in a file storage management module illustrated in FIG. 3.

Referring to FIGS. 3 and 4, the data processing apparatus may include a processor 110 and a file system 120.

The processor 110 may execute first and second application programs according to predefined processing order.

According to the exemplary embodiment of the present invention, the processor 110 executes the first and second application programs, that is, two application programs according to the processing order to be able to output an input file or data as one file or data. Further, the processor 110 executes two application programs but the number of application programs is not limited and may be executed by the pipeline method and is not limited thereto.

Herein, the processor 110 may receive the file data for the specific file from the file system 120 when the first application program executes read call for the specific file and provides the file data from the file system 120 depending on whether the first application program executes write call for the file data when the second application program executes the read call for the specific file.

When executing the read call for the specific file from the second application program, the file system 120 completes the write for the file data for the specific file to a data block allocated from the first application program and provides the file data to the second application program prior to executing a close call from the first application program.

That is, the file system 120 includes a file system application programming interface (API) 122 which perform the write and read operations for the specific file at the time of executing the read call and the write call for the specific file, a file state management module 124 which updates previously generated call information at the time of executing the read call and the write call for the specific file and provides the call information to make the file system API 122 perform the read and write operation for the specific file, and a file storage management module 126 which manages the file data for the specific file and reads or writes the file data at the time of executing the read call and the write call from the first and second application programs.

The file storage management module 126 may store the file data for the specific file when at least one of the first and second application programs executes the write call for the specific file and read the file data for the specific file from the allocated data block at the time of executing the read call for the specific file.

As the file storage management module 126, a storage medium (Not illustrated) such as a disk and a main memory may be used but is not limited thereto.

FIG. 4 illustrates that the file storage management module 126 stores and manages the file data in the storage medium using a circular queue.

As illustrated in FIG. 4, a dotted line box represents a file section in which the overall file is stored and a solid line box represents a data block in which the file data is stored in the storage medium and represents the circular queue.

Herein, at least one of the first and second application programs recognizes that a virtual file such as a dotted line box is present and handles the file data but actually stores some of the file data in the circular queue.

A reader sequentially reads blocks from the left of the storage section and a writer performs sequential recording from the right. To manage the section, the circular queue is used. The reader reads a block required in a queue_tail of the circular queue and the writer adds a block to a queue_head. A size of the data block of the file data which is actually stored in the storage medium may be limited to the size of the circular queue and is not limited thereto.

Figure 5:
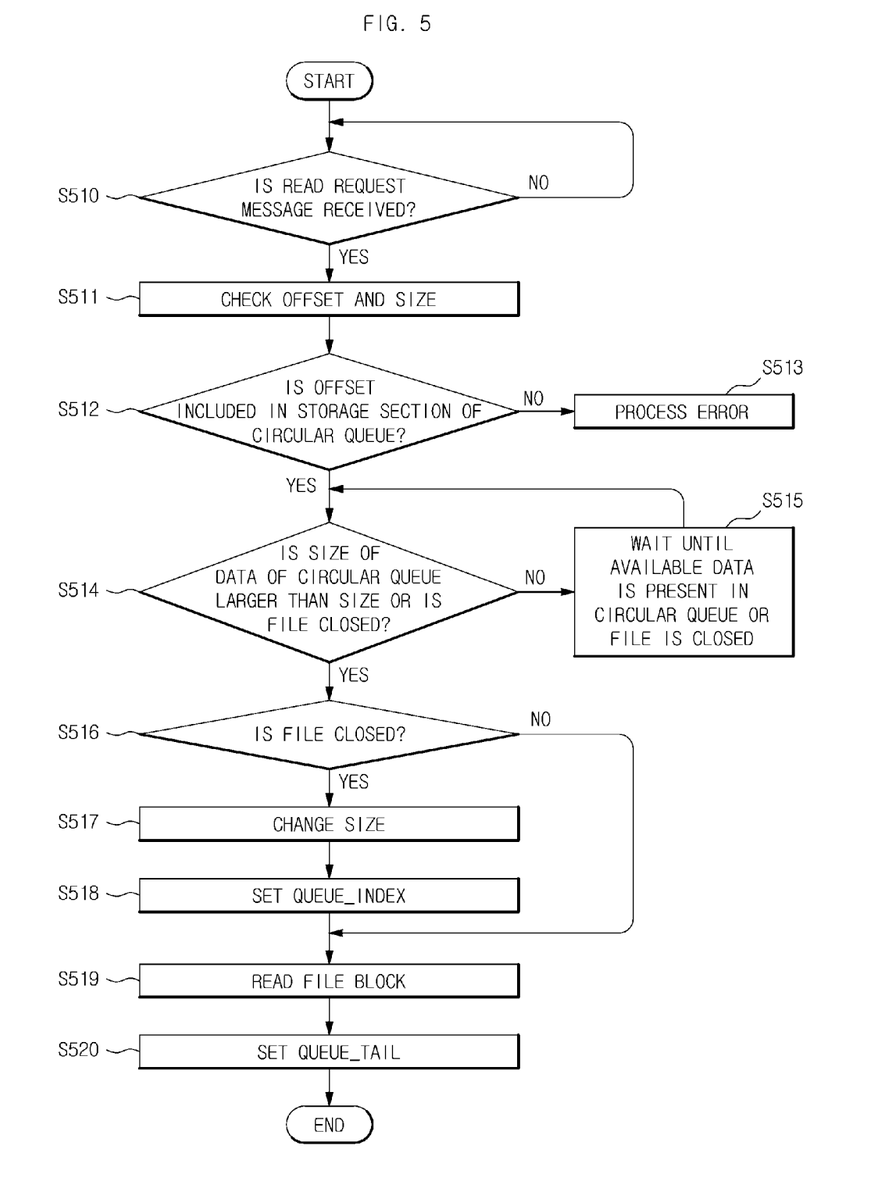
FIG. 5 is a flow chart illustrating a file read process according to the exemplary embodiment of the present invention.

FIG. 5 is a flow chart illustrating a file read process according to the exemplary embodiment of the present invention.

As illustrated in FIG. 5, when the file system receives a read request message from the application program (S510), it may check an offset and a size included in the received read request message (S511).

In this case, the offset represents a value up to a position spaced apart from a start position of the specific file previously stored in the circular queue and the size may represent a size of data to be read.

Next, the file system may check whether the offset is included in the storage section of the circular queue (S512). In this case, the file system performs error processing when the offset is not included in the storage section of the circular queue (S513).

Next, when the offset is included in the storage section of the circular queue, the file system may check whether the size of the data is larger than the size or the file is closed (S514). When the size of the data of the circular queue is smaller than the size or the file is not closed, the file system waits until an available data is present in the circular queue or the file is closed (S515).

When the size of the data of the circular queue is larger than the size or the file is closed, the file system may check whether the file is closed (S516).

When the file is closed, the file system may change the size representing the size of data to be read to the size of the available data of the circular queue from the offset (S517).

Next, the file system may set a queue_index representing a position of the circular queue (S518). Here, the queue_index may be set to be a value calculated by the following [Equation 1].

$$\text{Queue\_index} = \text{offset modulo queue\_size} \qquad \text{[Equation 1]}$$

In this case, when the file is not closed, the file system may set the queue_index representing the position of the circular queue without performing the process of changing the size to the size of the available data of the circular queue from the offset.

Next, the file system may read a block having a size corresponding to the size from the set position of the queue_index (S519).

Next, the file system may change the queue_tail of the circular queue to discard the read data (S520). Here, the queue_tail may be set to be a value calculated by the following [Equation 2].

$$\text{Queue\_tail} = (\text{queue\_tail} + \text{size}) \text{modulo queue\_size} \qquad \text{[Equation 2]}$$

Here, the queue_tail represents the previously set queue_tail within the circular queue, the size represents a size of data to be read, and the queue_size represents the size of the circular queue.

Figure 6:
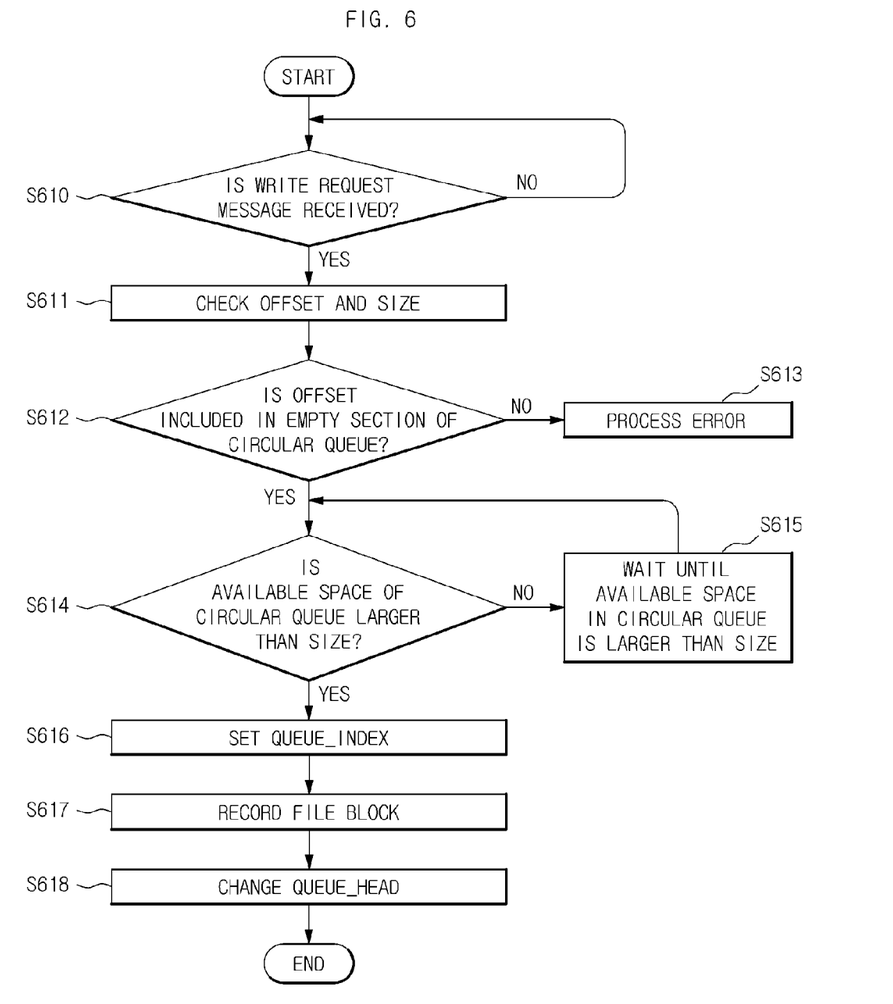
FIG. 6 is a flow chart illustrating a file write process according to the exemplary embodiment of the present invention.

FIG. 6 is a flow chart illustrating a file write process according to the exemplary embodiment of the present invention.

As illustrated in FIG. 6, when the file system receives a write request message from the application program (S610), it may check an offset and a size included in the received write request message (S611).

Next, the file system may check whether the offset is included in an empty section of the circular queue (S612).

Next, when the offset is included in the empty section of the circular queue, the file system may check whether an available space of the circular queue is larger than the size (S614). When the available space is smaller than the size, the file system waits until the available space of the circular queue is larger than the size (S615).

When the available space of the circular queue is larger than the size, the file system may set the queue_index which represents the position of the circular queue (S616).

Next, the file system may record a block having a size corresponding to the size from the set position of the queue_index (S617).

Next, the file system may change the queue_head of the circular queue to write a new data (S618). Here, the queue_head may be changed to be a value calculated by the following [Equation 3].

$$\text{Queue\_head} = (\text{queue\_head} + \text{size}) \text{modulo queue\_size} \qquad \text{[Equation 3]}$$

Here, the queue_head represents the previously set queue_head within the circular queue, the size represents a size of data to be read, and the queue_size represents the size of the circular queue.

Figure 7:
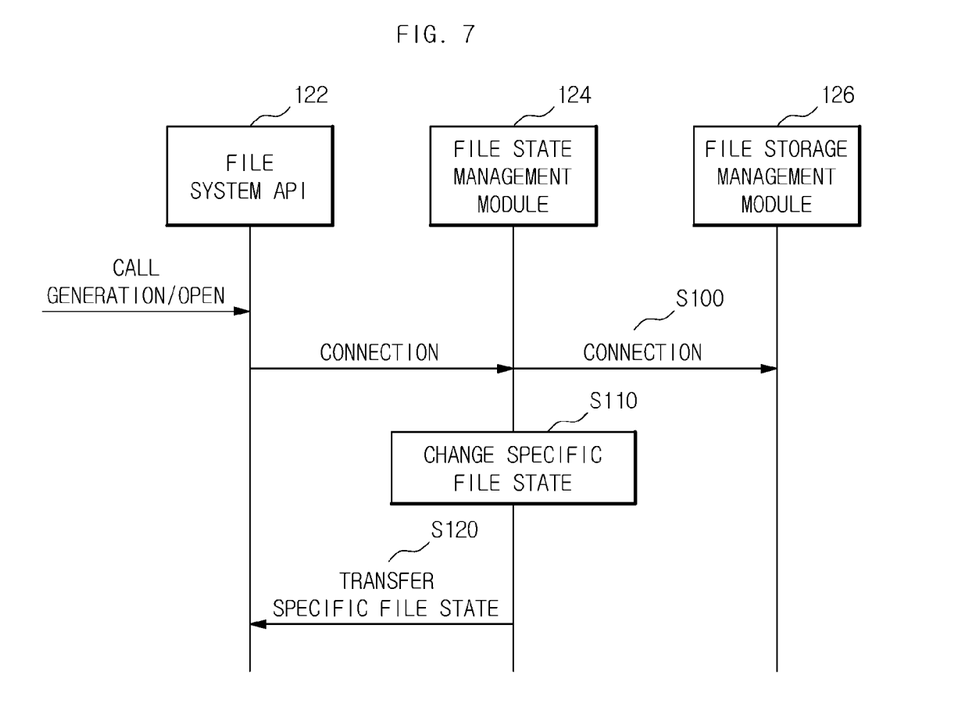
FIG. 7 is a flow chart illustrating an execution process of opening a file according to an exemplary embodiment of the present invention.

FIG. 7 is a flow chart illustrating an execution process of opening a file according to an exemplary embodiment of the present invention.

As illustrated in FIG. 7, according to the exemplary embodiment of the present invention, when any first application program generates or opens the specific file, an internal execution operation between components included in the data processing apparatus is illustrated. That is, when the first application program executes the generation or open call for the specific file, the file system API 122 is connected to the file state management module 124 and the file storage management module 126 to perform an operation corresponding to the call (S100).

Next, the file state management module 124 receives a file attribute for the specific file from the file system API 122 to generate or open the specific file and changes the state of the specific file to "open" (S110).

Further, the specific file is used as a data transfer medium between the first and second application programs and therefore a file generation mode/open mode allows only a read-only or write-only mode.

The file system API 122 is connected to the file storage management module 126 to allow any one of the first and second application programs recording in the specific file in the "open" state to use the write-only mode and the other of the first and second application programs reading the specific file to use the read-only mode (S120).

Figure 8:
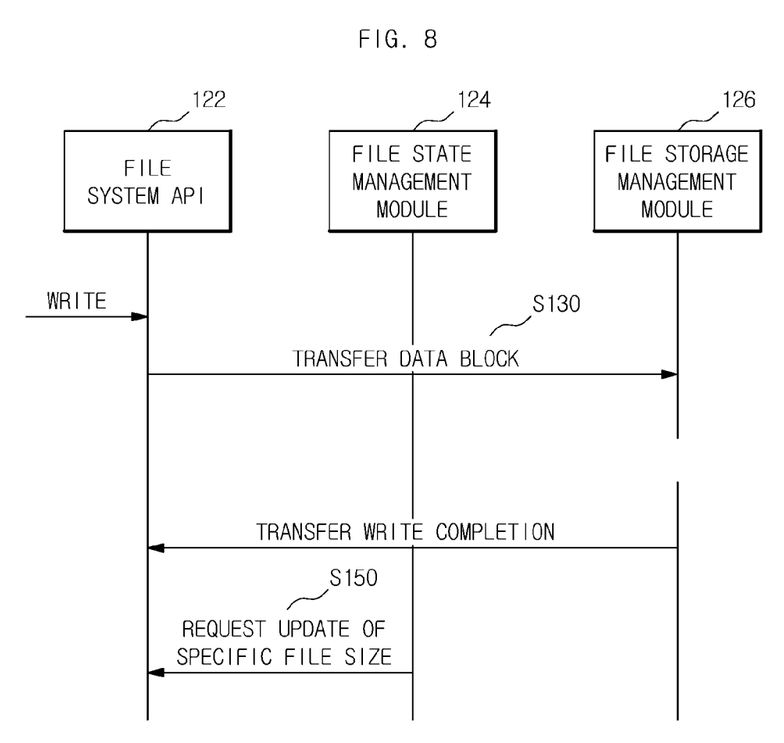
FIG. 8 is a flow chart illustrating an execution process at the time of recording a file block according to an exemplary embodiment of the present invention.

FIG. 8 is a flow chart illustrating an execution process at the time of recording a file block according to an exemplary embodiment of the present invention.

As illustrated in FIG. 8, according to the exemplary embodiment of the present invention, when any first application program writes the specific file, an internal execution operation between components included in the data processing apparatus is illustrated. That is, the file system API 122 is changed to the second application program immediately after transferring the data block which is written in the specific file to the file storage management module 126 and executes the following operations (S130).

The file storage management module 126 completes the data block writing and informs the file system API 122 of the complete information (S140).

Next, the file system API 122 requests the file state management module 124 to update the file size for the specific file (S150).

Here, since the update timing of the file size is later than the write timing of the data block, the second application program sharing the specific file may read a value smaller than the size of the actually written (recorded) specific file, such that the second application program reading the specific file may correctly recognize the end of the specific file.

Figure 9:
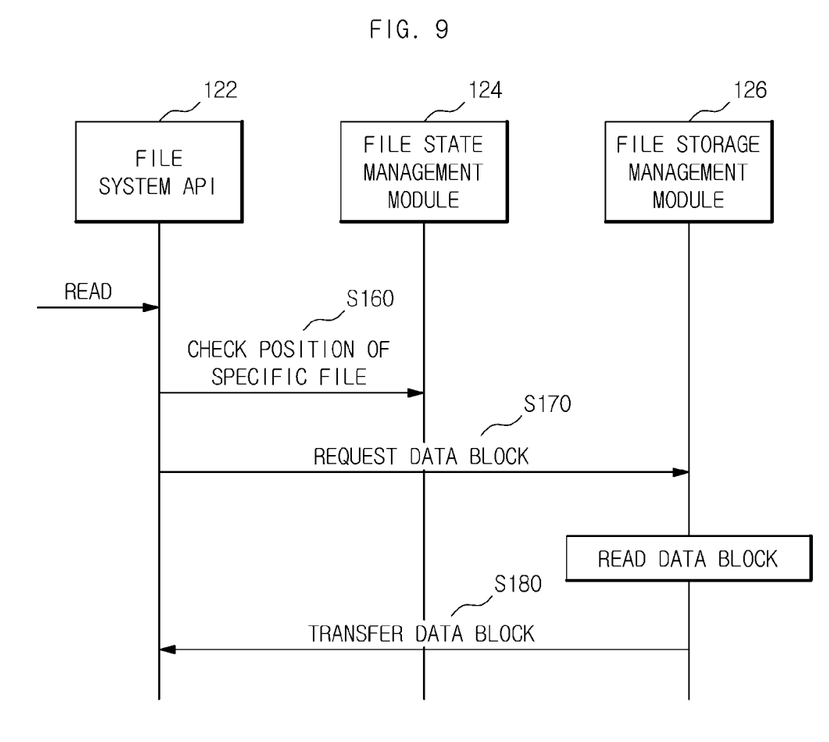
FIG. 9 is a flow chart illustrating an internal execution process of reading a file block according to an exemplary embodiment of the present invention.

FIG. 9 is a flow chart illustrating an internal execution process of reading a file block according to an exemplary embodiment of the present invention.

As illustrated in FIG. 9, according to the exemplary embodiment of the present invention, when any first application program read the specific file, an internal execution operation between components included in the data processing apparatus is illustrated. That is, when the first application program executes the read call to read the specific file, the file system API 122 requests the file state management module 124 to check an offset of the data block for the specific file (S160).

When the value of summing the position and size of the data block is smaller than the size of the file, the file system API 122 requests the file storage management module 126 of the data block (S170).

The file storage management module 126 reads the data block and transfers the read data block to the file system API 122.

Next, the file system API 122 transfers the transferred data block to the first application program and when the specific file is larger than the size, may execute the preset operation according to the state of the specific file.

Figure 10:
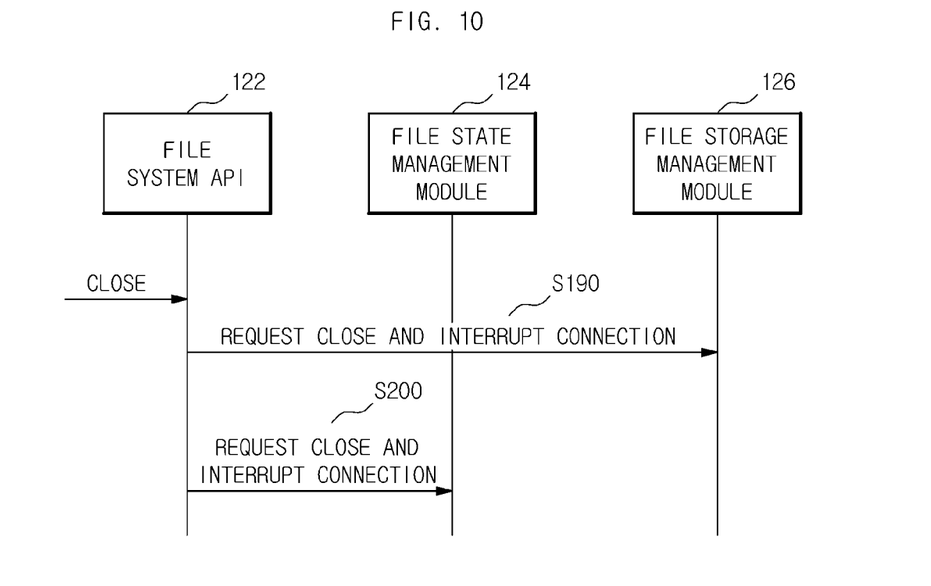
FIG. 10 is a flow chart illustrating an execution process of closing a file according to an exemplary embodiment of the present invention.

FIG. 10 is a flow chart illustrating an execution process of closing a file according to an exemplary embodiment of the present invention.

As illustrated in FIG. 10, according to the exemplary embodiment of the present invention, when any second application program closes the specific file, an internal execution operation between components included in the data processing apparatus is illustrated. That is, when the second application program executes the file close call, the file system API 122 interrupts the connection with the file state management module 124 and the file storage management module 126 (S190).

In this case, the file state management module 124 determines whether the file state is changed by referring to an open mode of the specific file corresponding to the previous connection. In other words, when the open mode is the write-only mode, the file state management module 124 changes the file state to "close" and when the open mode is the read-only mode, keeps the state as it is. When changing the state to the "close", all the application programs waiting in the read call need to recognize the state change. The reason is that when the file is in the "write" state, the application program retrying the data block reading in the read call need not try the data block reading any more.

Figure 11:
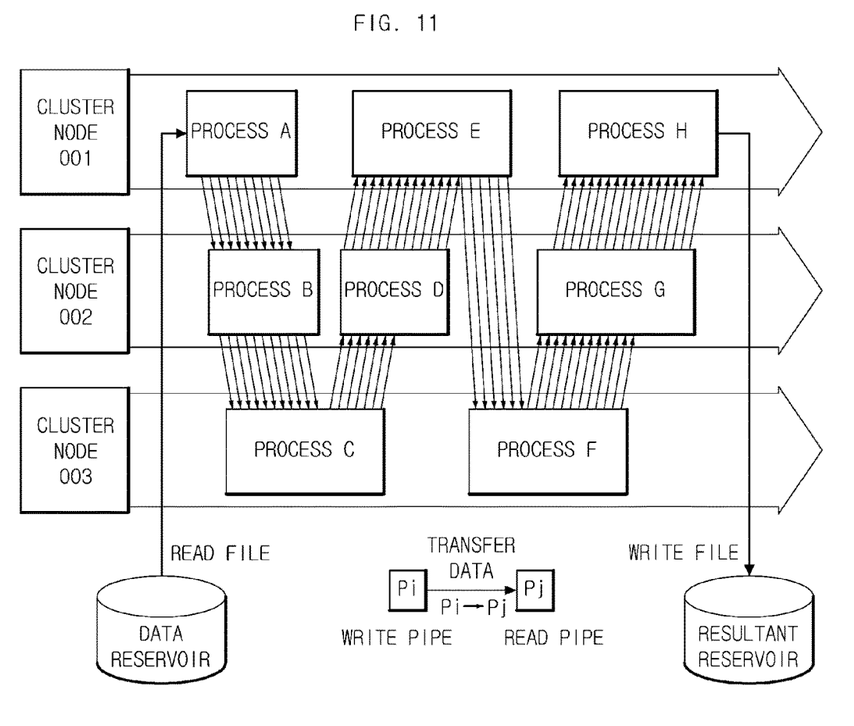
FIG. 11 is a second diagram for describing an execution principle using a remote pipe according to an exemplary embodiment of the present invention.

FIG. 11 is a second diagram for describing an execution principle using a remote pipe according to an exemplary embodiment of the present invention.

FIG. 11 illustrates a process of distributing and executing the pipeline configured of Process A to Process H using the remote pipe in the cluster configured of three nodes.

Process A reads an initial input file from the disk, generates an output using the remote pipe and Process B receives the input from the remote pipe to generate an output to another remote pipe. By repeating this process to Process H, the execution of the pipeline may be completed.

According to the exemplary embodiments of the present invention, the data processing apparatus may reduce the execution time of the pipeline by overlappingly executing the application programs of the pipeline while using the file input and output as it is.

Further, according to the exemplary embodiments of the present invention, the data processing apparatus may be applied to the pipeline stage and the process of inputting data by the user.

Further, according to the exemplary embodiments of the present invention, the data processing apparatus may execute the pipeline from the moment the user transmits data online, thereby reducing the waiting time of the user and the burden of the large-capacity data transmission.

Further, according to the exemplary embodiments of the present invention, the data processing apparatus may switch the disk 10 to the network 10, thereby increasing the input and output speed of the data block and saving the disk space.

Further, according to the exemplary embodiments of the present invention, the data processing apparatus may provide the computing environment in which the execution environment of the existing application programs is guaranteed and the application programs of several stages may be operated in parallel, thereby efficiently using the large-capacity computing resources.

Further, according to the exemplary embodiments of the present invention, the data processing apparatus may perform the pipeline using the plurality of nodes in the cluster system without using the distributed file system, thereby providing the environment in which the data processing may be more rapidly made.

Meanwhile, the exemplary embodiment of the present invention describes that all the components configuring the present invention as described above are coupled in one or are operated, being coupled with each other, but is not necessarily limited thereto. That is, at least one of all the components may be operated, being optionally coupled with each other within the scope of the present invention. Further, all the components may be each implemented in one independent hardware, but a part or all of each component may be selectively combined to be implemented as a computer program having a program module performing some functions or all the functions combined in one or a plurality of hardwares. Further, the computer program is stored in computer readable media, such as a USB memory, a CD disk, a flash memory, and the like, to be read and executed by a computer, thereby implementing the exemplary embodiment of the present invention. An example of the storage media of the computer program may include a magnetic recording medium, an optical recording medium, a carrier wave medium, and the like.

A person with ordinary skilled in the art to which the present invention pertains may variously change and modify the foregoing exemplary embodiments without departing from the scope of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the appended claims and it should be analyzed that all spirits within a scope equivalent thereto are included in the appended claims of the present invention.

What is claimed is:

1. A data processing apparatus for pipeline execution acceleration, comprising:
   a processor configured to:
   execute a first application program writing file data to a specific file, and
   execute a second application program reading the file data from the specific file; and
   a file system communicationally coupled to the processor and configured as a virtual ring type storage space in form of a circular queue of data blocks to store at least some of the file data for the specific file to cause the at least some of the file data be readable from a data block among the data blocks by the second application program prior to executing a close call for the writing of the file data to for the specific file from the first application program,
   wherein the file system is further configured to,
   set for the circular queue a queue_tail that represents a position for reading the file data and set a queue_head that represents a position for writing a file data,
   perform a setting of a queue_index for a read that represents a start position of the circular queue at a time of executing the read from the specific file by the second application program to read file data having a size from the set queue_index and in response to the read, change the queue_tail of the circular queue,
   the setting of the queue_index for the read includes to,
   check, in a read request message, for an offset, which represents a value up to a position spaced apart from a previous start position of the specific file previously stored for the circular queue, and for a size, which represents a size of the file data to be read, and
   set the queue_index using the offset when a size of the circular queue is larger than the size included in the read request message and the specific file is closed.

2. The data processing apparatus of claim 1, wherein the queue_tail is obtained by the following equation (queue_tail=(queue_tail+size) modulo queue_size), in which the queue_tail represents the queue_tail within the circular queue, the size represents the size of the file data to be read, and the queue_size represents a size of the circular queue.

3. The data processing apparatus of claim 1, wherein the file system is further configured to,
set a queue_index for the writing representing the start position of the circular queue for the writing at a time of executing the writing from the second application program, and
write the file data having a size from the set queue_index and in response to the write, change the queue_head of the circular queue.

4. The data processing apparatus of claim 3, wherein to set the queue_index for the writing includes,
checking, in a write request message, for an offset, which represents a value up to a position spaced apart from a previous start position of the specific file previously stored within the circular queue and for a size, which represents a size of the file data to be written, and
setting the queue_index using the offset when the offset is included in an empty section of the circular queue and an available space of the circular queue is larger than the size.

5. The data processing apparatus of claim 3, wherein the queue_head is obtained by the following equation (queue_head=(queue_head+size) modulo queue_size), wherein the queue_head represents the queue_head within the circular queue, the size represents the size of the file data to be written, and the queue_size represents a size of the circular queue.

6. The data processing apparatus of claim 1, the file system is further configured to:
present an application programming interface (API) configured to perform write and read operations of the specific file according to the circular queue at the time of executing the read and the write for the specific file;
update previously generated call information for the read and the write according to the circular queue at the time of executing the read and the write for the specific file and provide the call information to allow the API to perform the read and write operations for the specific file; and
manage the file data for the specific file and read or write the file data according to the circular queue at the time of executing the read and the write from the first and second application programs.

7. A data processing method for pipeline execution acceleration, comprising:
executing, by a processor, a first application program writing file data to a specific file;
executing, by the processor, a second application program reading the file data from the specific file; and
providing, by a file system, a virtual ring type storage space configured in form of a circular queue of data blocks that stores at least some of the file data for the specific file to cause the at least some of the file data for the specific file be readable from a data block among the data blocks by the second application program prior to executing a close call for the writing of the file data to the data for the specific file from the first application program,
wherein by the file system,
set for the circular queue a queue_tail that represents a position for reading the file data and set a queue_head that represents a position for writing the file data,
perform a setting of a queue_index for a read that represents a start position of the circular queue at a time of executing the read from the specific file by the second application program to read file data having a size from the set queue_index and in response to the read, change the queue_tail of the circular queue,
the setting of the queue_index for the read includes to,
check, in a read request message, for an offset, which represents a value up to a position spaced apart from a previous start position of the specific file previously stored for the circular queue, and for a size, which represents a size of the file data to be read, and
set the queue_index using the offset when a size of the circular queue is larger than the size included in the read request message and the specific file is closed.

8. The data processing method of claim 7, wherein the queue_tail is obtained by the following equation (queue_tail=(queue_tail+size) modulo queue_size), in which the queue_tail represents the queue_tail within the circular queue, the size represents the size of the file data to be read, and the queue_size represents a size of the circular queue.

9. The data processing method of claim 7, wherein by the file system,
setting a queue_index for the writing representing the start position of the circular queue for the writing at a time of executing the writing from the second application program, and
writing the file data having a size from the set queue_index and in response to the writing, changing the queue_head of the circular queue.

10. The data processing method of claim 9, wherein to set the queue_index for the writing includes,
checking, in a write request, for an offset, which represents a value up to a position spaced apart from a previous start position of the specific file previously stored within the circular queue and for a size, which represents a size of the file data to be written, and
setting the queue_index is set using the offset when the offset is included in an empty section of the circular queue and an available space of the circular queue is larger than the size.

11. The data processing method of claim 9, wherein the queue_head is obtained by the following equation (queue_head=(queue_head+size) modulo queue_size), in which the queue_head represents the queue_head within the circular queue, the size represents the size of the file data to be written, and the queue_size represents a size of the circular queue.

\* \* \* \* \*